United States Patent
Dheur et al.

(10) Patent No.: US 7,284,583 B2
(45) Date of Patent: *Oct. 23, 2007

(54) PNEUMATIC TIRE WITH ELECTRICALLY CONDUCTIVE CORD EXTENDING FROM ITS OUTER WHEEL-RIM MOUNTING SURFACE TO ITS INTERNAL TREAD PORTION

(75) Inventors: Jean Luc Dheur, Arlon (BE); Pierre Marie Jean Dauvister, Ettelbruck (LU)

(73) Assignee: The Goodyear Tire & Rubber Company, Akron, OH (US)

( * ) Notice: Subject to any disclaimer, the term of this patent is extended or adjusted under 35 U.S.C. 154(b) by 120 days.

This patent is subject to a terminal disclaimer.

(21) Appl. No.: 11/152,463

(22) Filed: Jun. 14, 2005

(65) Prior Publication Data

US 2006/0021687 A1 Feb. 2, 2006

Related U.S. Application Data (60) Provisional application No. 60/591,395, filed on Jul. 27, 2004.

(51) Int. Cl.
*B60C 9/00* (2006.01)
*B60C 9/04* (2006.01)
*B60C 19/08* (2006.01)
*H05F 3/00* (2006.01)

(52) U.S. Cl. ............... 152/152.1; 152/451; 152/557; 152/DIG. 2; 361/216; 361/222

(58) Field of Classification Search ............ 152/152.1, 152/451, 556, 557, DIG. 2; 361/212, 216, 361/217, 220, 222
See application file for complete search history.

(56) References Cited

U.S. PATENT DOCUMENTS

2005/0087275 A1  4/2005 Zanzig et al.

FOREIGN PATENT DOCUMENTS

| DE | 820543 | 7/1949 |
| EP | 658452 | 6/1995 |
| FR | 1279913 | 11/1961 |

OTHER PUBLICATIONS

Patent Abstract of Japan, Publication No. 57194109, publication date Nov. 29, 1982.
European Search Report Nov. 18, 2005.

*Primary Examiner*—Adrienne C. Johnstone
(74) *Attorney, Agent, or Firm*—Henry C. Young, Jr.

(57) ABSTRACT

This invention relates to a pneumatic rubber tire which contains at least one electrically conductive cord extending from an external outer surface of its wheel-rim mounting surface rubber component to an internal electrically conductive tread base layer rubber component to provide a path of least electrical resistance, namely an electrically conductive path, between the outer tire wheel-rim mounting surface and the internal tire tread base layer. The electrically conductive cord is comprised of at least one electrically conductive metal filament (e.g. metal filament, carbon fiber or combination of metal filament and carbon fiber) spirally wound around a centrally disposed core of at least one organic fiber.

19 Claims, 1 Drawing Sheet

PNEUMATIC TIRE WITH ELECTRICALLY CONDUCTIVE CORD EXTENDING FROM ITS OUTER WHEEL-RIM MOUNTING SURFACE TO ITS INTERNAL TREAD PORTION

This application claims the benefit of Provisional Application Ser. No. 60/591,395 filed Jul. 27, 2004.

FIELD OF THE INVENTION

This invention relates to a pneumatic rubber tire which contains at least one electrically conductive cord extending from an external outer surface of its wheel-rim mounting surface rubber component to an internal electrically conductive tread base layer rubber component to provide a path of least electrical resistance, namely an electrically conductive path, between the outer tire wheel-rim mounting surface and the internal tire tread base layer. The electrically conductive cord is comprised of at least one electrically conductive filament (e.g. metal filament, carbon fiber or combination of metal filament and carbon fiber) spirally wound around a centrally disposed core of at least one organic fiber.

BACKGROUND OF THE INVENTION

Pneumatic rubber tires conventionally have sidewall components which are positioned between at least one bead region of the tire and the tread region of the tire. The tread component of the tire is designed to provide a running surface of the tire for ground-contacting purposes. A wheel-rim mounting surface is conventionally provided in the bead region of the tire which is designed contact a rigid metal rim onto which the tire is mounted to create a tire/wheel assembly.

The bead region of the tire normally includes a rubber encapsulated essentially inextensible bead composed of a bundle of wire cords. The bead region of the tire also normally includes at least one rubber component having a tire mounting surface, for example a chafer and/or toe guard component, of a rubber composition which is designed to be rim-contacting, and therefore a mounting surface of the tire. Such mounting surface rubber composition conventionally contains a significant rubber reinforcing carbon black content and is thereby relatively electrically conductive. Such tire bead region with associated rubber component(s) are well known to those having skill in such art.

For some applications, however, it may be desired to reduce the rubber reinforcing carbon black content of the tire chafer and/or toe guard component(s) to, in turn, reduce the component's hysteresis and thereby make it less hysteretic. A lower hysteretic tire chafer and/or toe guard component of the tire promotes a lower rolling resistance and/or lower heat build up for the respective tire with an associated beneficial increase in fuel economy for an associated vehicle and/or durability of the tire itself.

However, such reduction in reinforcing carbon black content in the chafer and/or toe guard component(s) can also significantly reduce the electrical conductivity of the tire bead area, or region, particularly if the carbon black content is reduced below its percolation point, which, in turn, can result in significantly reducing or eliminating the aforesaid path of suitable electrical resistance between the tire's bead region and the tire's tread region.

Such tire chafer and toe guard components as well as tire bead regions and tire tread regions in general, are well known to those having skill in such art.

The tire tread may be of a cap/base layered construction with the outer cap layer having a running surface of the tire designed to be ground-contacting. The tread base layer underlies and supports the outer tread cap layer and is designed to be a transition between the outer tread cap layer and tire carcass plies or tire belt plies. Such tread base layer is conventionally of a rubber composition reinforced with a significant rubber reinforcing carbon black content to be relatively electrically conductive. Such tire tread cap/base construction is well known to those having skill in such art.

A tire may often contain a circumferential belt ply positioned between the tread base layer and the tire carcass plies. Such belt ply is normally composed of metal cords of twisted, or cabled, metal filaments wherein the metal cords are encompassed by a rubber composition (e.g. a rubber wire coat) which is reinforced with a significant rubber reinforcing carbon black content to be relatively electrically conductive. Such belt ply positioning and construction is well known to those having skill in such art.

The tire carcass itself is normally composed of one or more plies of cords encompassed by a rubber composition which usually contains only a more minimal rubber reinforcing carbon black content so that it is thereby relatively electrically nonconductive as compared to said bead region components, tire tread base layer and belt ply rubber. However, for this invention, the rubber composition for a carcass ply, if desired, may be provided as being electrically conductive by inclusion of a significant carbon black content. The carcass ply(ies) typically extend from bead-to-bead through a crown region of the tire. Such carcass ply(ies) construction of the tire is well known to those having skill in such art. The crown region of the tire is the portion of the tire which includes the portion of the tire carcass beneath the tire tread region as the carcass ply(ies) passes from one bead region to the other bead region of the tire as one having skill in such art would understand.

Conventionally, the outer visible rubber layer of the tire sidewalls is of a rubber composition which is reinforced with a significant rubber reinforcing carbon black content so it is relatively electrically conductive in a manner that a suitable path of least electrical resistance is thereby provided to promote dissipation of static electricity from the bead region of the tire (from its wheel-rim mounting surface rubber component) to the tread region with its running surface.

For some applications, however, it may be desired to reduce the carbon black content of the tire outer sidewall layer to, in turn, reduce its hysteresis and thereby make it less hysteretic. A lower hysteretic tire sidewall rubber layer promotes a lower rolling resistance and/or lower heat build up for the respective tire with an associated beneficial increase in fuel economy for an associated vehicle and/or durability of the tire itself. Typically, an increase in the rubber composition's rebound value is indicative of reduced hysteresis in the rubber composition. In practice, a reduction of the carbon black content of the sidewall rubber composition may be accomplished by replacing a portion of the carbon black with amorphous silica reinforcement (e.g. a precipitated silica).

However, such reduction in carbon black content in the outer sidewall layer can also significantly reduce the electrical conductivity of the tire sidewall layer, particularly if the carbon black content is reduced below its percolation point, which, in turn, can result in significantly reducing or even eliminating the aforesaid path of suitable electrical conductivity between the tire's bead region and the tire's tread region.

In one aspect, it is desired to provide a tire having an outer, visible tire sidewall layer of a rubber composition having a relatively low carbon black content to an extent that the tire sidewall rubber layer is relatively electrically non-conductive.

For this invention, an electrically conductive cord is provided to provide a path of least electrical resistance between the tire bead region and tire tread region. The cord is provided as at least one filament in a form of metal filament or carbon fiber or combination of metal filament and carbon fiber spirally (helically) wound around a core of one or more organic filaments. The significance of using such spirally wound electrically conductive filament(s) is to enable the relatively inextensible filament(s) to be dynamically extended and flexed, because of its (their) helically coiled configuration, during the working of the tire and to thereby reduce its fatigue. The organic fiber is used to provide a supporting core substrate for the helically wound electrically conductive filament(s).

In the description of this invention, the term "phr" relates to parts by weight of an ingredient per 100 parts by weight of rubber, unless otherwise indicated.

The terms "rubber" and "elastomer" are used interchangeably unless otherwise indicated. The terms "vulcanized" and "cured" are used interchangeably unless otherwise indicated. The terms "compound" and "rubber composition" may be used interchangeably unless indicated. The term "carbon black" is used to refer to rubber reinforcing carbon blacks unless otherwise indicated. Exemplary rubber reinforcing carbon blacks may be referred to, for example, in the *Vanderbilt Rubber Handbook* (1978) on Pages 414 through 417.

DISCLOSURE AND PRACTICE OF THE INVENTION

In accordance with this invention, a pneumatic rubber tire of open toroidal shape is comprised of:
(A) a tire tread portion comprised of:
  (1) a circumferential rubber tread of a cap/base layered construction wherein said tread cap rubber layer has an outer tire tread running surface and said tread base rubber layer underlies said tread cap layer, and
  (2) an internal circumferential belt ply layer underlying said circumferential tread wherein said belt ply layer is comprised of steel cords encompassed by a rubber composition (sometimes referred to as a wire coat rubber composition) contiguous with said tread base rubber layer;
(B) two spaced apart bead regions individually comprised of:
  (1) a bead portion comprised of a composite of relatively inextensible steel cords (e.g. steel cords having a brass coating) encompassed by a bead coat of a rubber composition, and
  (2) an additional bead portion comprised of at least one rubber component wherein at least one of said additional bead portion rubber components has a mounting surface (a wheel-rim mounting surface) adapted for mounting said tire on a rigid metal rim,
(C) at least one carcass ply comprised of a cord reinforced carcass ply rubber composition wherein at least one of said carcass plies extends from one bead portion to the other bead portion through the crown region of the tire,
(D) two outer tire rubber sidewall layers individually extending between said bead region and said tread, and
(E) at least one electrically conductive cord comprised of at least one electrically conductive filament comprised of at least one of metal filament(s) and carbon fiber (e.g. metal filament, carbon fiber or combination of metal filament and carbon fiber) spirally wound around a core of at least one organic fiber, wherein said electrically conductive cord extends from an outer surface of at least one of said internal bead region additional rubber components having a wheel-rim tire mounting surface and said tread rubber base layer to said internal circumferential belt ply wherein said electrically conductive cord is positioned
  (1) on the outer surface of a carcass ply between said carcass ply and said sidewall rubber layer,
  provided, however, that when said electrically conductive cord is positioned on the surface of a carcass ply,
    (a) the said tread base layer, said tread belt ply, said tire bead composite, and said carcass ply(ies) are relatively electrically conductive by being comprised of carbon black-rich, rubber based rubber compositions having a relatively high electrical conductivity, and
    (b) at least one of the said additional bead component(s) is relatively electrically non-conductive (e.g. in a sense of being composed of a rubber composition which contains only a minimal reinforcing carbon black content or contains no carbon black);
    (c) the said outer rubber sidewall layer is:
      (i) relatively electrically conductive, (e.g. in a sense of being comprised of a carbon black rich rubber composition), or
      (ii) relatively electrically non-conductive (e.g. in a sense of being comprised of a rubber composition which contains only a minimal carbon black content or contains no carbon black); or
  provided however that when said electrically conductive cord is positioned on the surface of a carcass ply between a carcass ply and said outer sidewall layer,
    (d) the said tread base layer, tread belt ply and tire bead composite are relatively electrically conductive by being comprised of carbon black-rich rubber compositions having a relatively high electrical conductivity, and
    (e) at least one of said carcass ply(ies) and/or said outer sidewall rubber layer is:
      (i) relatively electrically conductive, (e.g. in a sense of being comprised of a carbon black rich rubber composition), or
      (ii) relatively electrically non-conductive (e.g. in a sense of being comprised of a rubber composition which contains only a minimal carbon black content or contains no carbon black);
  wherein the rubber composition of said tire tread rubber cap layer
    (f) is comprised of a carbon black-rich diene rubber based rubber composition (in a sense of thereby having a relatively high electrical conductivity), or
    (g) is comprised of a diene rubber based rubber composition which contains a more minimal carbon black content (and thereby in a sense of having a relatively low electrical conductivity); wherein a thin carbon black-rich rubber strip thereby having a relatively high electrical conductivity is positioned through or around said tread cap layer having the more minimal carbon black content and wherein said thin rubber strip extends from, and as a part of, said tread base rubber layer to at least a portion of the running surface of said tread cap layer;

wherein the rubber composition of said outer rubber sidewall layer contains reinforcing filler as:
(h) from about 50 to about 65 phr of rubber reinforcing carbon black, (and thereby considered herein in a sense of being relatively electrically conductive), or
(i) from about 25 to about 40 phr of rubber reinforcing carbon black (and thereby considered herein in a sense of being relatively electrically non-conductive), or
(j) from about 25 to about 65 phr of amorphous, precipitated silica and from zero to 10 phr of rubber reinforcing carbon black (and thereby considered herein in a sense of being relatively electrically nonconductive), or
(k) about 40 to about 70 phr of reinforcing filler as;
  (i) about 25 to about 40 phr of amorphous, precipitated silica and
  (ii) about 25 to about 35 phr of rubber reinforcing carbon black (and thereby considered herein in a sense of being relatively non-electrically conductive);
wherein a coupling agent is provided for said amorphous silica which has a moiety reactive with hydroxyl groups (e.g. silanol groups) contained on said amorphous silica and another moiety interactive with said diene-based elastomer(s);
wherein said carbon black for said rubber sidewall layer has a dibutyl phthalate (DBP) value (ASTM D2414) in a range of from about 115 to about 125 $cm^3/100$ g together with an Iodine value (ASTM D1510) in a range of from about 35 to about 50 ml/100 g;
wherein the rubber composition of said carcass ply(ies) contains reinforcing filler as:
(l) about 45 to about 70, alternately about 50 to about 65, phr of rubber reinforcing carbon black, (and is therefore considered herein as being relatively electrically conductive), or
(m) from 25 to about 60 phr of reinforcing filler as;
  (i) from 5 to about 35 phr of carbon black, and
  (ii) about 15 to about 55 phr of amorphous, precipitated silica together with a coupling agent for said silica (and is therefore considered herein in a sense of being relatively electrically non-conductive);
wherein said carbon black has a dibutyl phthalate (DBP) value (ASTM D2414) in a range of from about 70 to about 110 $cm^3/100$ g together with an Iodine value (ASTM D1510) in a range of from about 30 to about 80 ml/100 g;
wherein the rubber composition for said tread rubber cap layer contains reinforcing filler as:
(n) about 45 to about 110 phr of rubber reinforcing carbon black, (and is therefore considered herein in a sense of being relatively electrically conductive), or
(o) from 45 to about 105 phr of reinforcing filler as;
  (i) from 5 to about 25 phr of carbon black, and
  (ii) about 40 to about 100 phr of amorphous, precipitated silica together with a coupling agent for said silica (and is therefore considered herein in a sense of being relatively electrically non-conductive);
wherein said carbon black has a dibutyl phthalate (DBP) value (ASTM D2414) in a range of from about 110 to about 130 $cm^3/100$ g together with an Iodine value (ASTM D1510) in a range of from about 85 to about 150 ml/100 g;

wherein the rubber composition for said thin rubber strip extending through or around said tread rubber cap layer is of a carbon black-rich rubber composition, containing about 50 to about 75 phr of rubber reinforcing carbon black having a dibutyl phthalate (DBP) value in a range of from about 100 to about 130 $cm^3/100$ g together with an Iodine value in a range of from about 90 to about 125 ml/100 g;
wherein the rubber composition of the said bead coat contains about 60 to about 125 phr of rubber reinforcing carbon black having a dibutyl phthalate (DBP) value in a range of from about 70 to about 125 $cm^3/100$ g together with an Iodine value in a range of from about 80 to about 145 ml/100 g, (and is therefore considered herein in a sense of being relatively electrically conductive);
wherein the rubber composition of said additional bead portion component(s) contains reinforcing filler as:
(p) from about 50 to about 100 phr of rubber reinforcing carbon black (and is therefore considered herein in a sense of being relatively electrically conductive), or
(q) from about 60 to about 125 phr of reinforcing filler as:
  (i) from about 50 to about 100 phr of amorphous, precipitated silica together with a coupling agent for the silica, and
  (ii) from about 5 to about 35 phr of rubber reinforcing carbon black (and is therefore considered herein in a sense of being relatively non-conductive),
wherein the coupling agent provided for said amorphous silica in said additional bead component(s) which has a moiety reactive with hydroxyl groups (e.g. silanol groups) contained on said amorphous precipitated silica and another moiety interactive with said diene-based elastomer(s);
wherein said carbon black for said additional bead portion component(s) has a dibutyl phthalate (DBP) value (ASTM D2414) in a range of from about 110 to about 130 $cm^3/100$ g together with an Iodine value (ASTM D1510) in a range of from about 85 to about 150 ml/100 g;
wherein the rubber composition of said belt ply contains from about 55 to about 75 phr of rubber reinforcing carbon black having a dibutyl phthalate (DBP) value in a range of from about 65 to about 85 $cm^3/100$ g together with an Iodine value in a range of from about 75 to about 95 ml/100 g, (and is therefore considered herein in a sense of being relatively electrically conductive);
wherein the rubber composition of said tire tread rubber base layer contains from about 50 to about 70 phr of rubber reinforcing carbon black having a dibutyl phthalate (DBP) value in a range of from about 90 to about 125 $cm^3/100$ g together with an Iodine value in a range of from about 40 to about 95 ml/100 g, (and is therefore considered herein in a sense of being relatively electrically conductive);
wherein the rubber composition of said tire inner liner layer contains from about 55 to about 80 phr of rubber reinforcing carbon black having a dibutyl phthalate (DBP) value in a range of from about 85 to about 95 $cm^3/100$ g together with an Iodine value in a range of from about 30 to about 45 ml/100 g, (and is therefore considered herein in a sense of being relatively electrically non-conductive as compared to the aforesaid bead composite, tread base and belt ply tire components).

In practice, it is recognized that the spirally wound (helically wound) filament of at least one metal filament and/or carbon fiber of the said electrically conductive cord (e.g. stainless steel or copper or brass wire for the metal filament for example) would have an electrical resistance of only a few ohms and significantly less than 100 ohms resistance, depending somewhat how tightly the wire is wound around the core, the selection of the filament composition (e.g. stainless steel, carbon fiber or combination of stainless steel filament and carbon fiber), the number of electrically conductive filaments, and the length of the electrically conductive cord itself.

In practice the diameter of said core of the electrically conductive cord typically has a significantly greater diameter than the diameters of said electrically conductive metal filament and carbon fiber.

In practice, preferably the rubber compositions of said individual tire bead coat, said tire tread rubber base layer, said tire belt ply, said optional relatively electrically conductive tread rubber cap layer, said optional relatively electrically conductive outer sidewall layer, said optional relatively electrically conductive carcass ply(ies), and said optional thin rubber strip extending through or around said tread rubber cap layer contains a rubber reinforcing carbon black content of at least 40 phr, depending somewhat upon the selection of the rubber reinforcing carbon black itself as hereinbefore addressed, and in a sufficient amount that is above the carbon black percolation point to thereby make the rubber composition relatively electrically conductive. The term "percolation point" is well known to those having skill in such art.

It is considered herein that said rubber of said bead composite, said tire tread rubber base layer, said rubber of said belt ply, said relatively electrically conductive tread rubber cap layer, said thin rubber strip extending through or around said tread rubber cap layer, and optionally said outer rubber sidewall layer, are relatively electrically conductive because of a combination of their rubber reinforcing carbon black contents combined with the characterization of the carbon blacks in terms of their DBP and Iodine values.

It is considered herein that said rubber of said carcass plies, tire innerliner layer, and optionally said outer rubber sidewall layer, are relatively electrically non-conductive (relative to said tire bead coat rubber, said tire tread rubber base layer, rubber of said belt ply, said relatively electrically conductive tread rubber cap layer and said thin rubber strip extending through or around said tread rubber cap layer) because of a combination of their limited rubber reinforcing carbon black contents combined with the characterization of the carbon blacks in terms of their DBP and Iodine values.

Representative examples of rubber reinforcing carbon blacks, as represented in *The Vanderbilt Rubber Handbook*, 1978, Page 417, are, for example, according to their ASTM designations:

For said tire bead region rubber components, including said additional bead region rubber components: N660, N550, N375, N236 and N234;

For said tire tread rubber base layer: N660, N555, N375 and N347;

For said rubber of said belt ply: N347, N330 and N326;

For said tread rubber cap layer: N375, N234, N220, N134, N121, N115 and N110;

For said thin rubber strip which optionally extends through or around said tread rubber cap layer: N375, N347 and N234;

For said carcass ply rubber: N660, N550 and N326;

For said tire inner liner layer: N660; and

For said tire outer sidewall rubber layer: N550, N660, N375, N330 and N326.

In further accordance with this invention, such tire is provided having an electrical path of least electrical resistance extending from a mounting surface of a rubber component in the bead portion of the tire to the running surface of the tire rubber cap layer.

In particular, said electrical path of least electrical resistance extends from the wheel-rim mounting surface of a rubber component in the bead region of the tire to said electrically conductive cord, without inclusion (exclusive of) of an optional intermediate electrically conductive rubber component contiguous with said wheel-rim mounting surface-containing rubber component, thence to either said electrically conductive tread base rubber layer or through said electrically conductive rubber of said belt ply to said tread base rubber layer, thence to the running surface of said tire rubber cap layer via said tire rubber cap layer or, optionally, via said thin rubber strip which optionally extends through or around said tread rubber cap layer to at least a portion of the running surface thereof and wherein said electrically conductive cord is exclusive of an outer surface of said tire.

In practice, said additional rubber component composition(s) of said tire bead region which is (are) relatively non-electrically conductive may be in a form of a tire chafer, chipper and/or toe guard and such components for a tire bead portion of the tire are well known to those having skill in such art. In this disclosure, at least one of the tire chafer and toe guard components is relatively electrically non-conductive, both are contiguous with each other and, together, have a tire wheel-rim tire mounting surface. A continuous path of relative electrical conductivity is provided extending from said electrically conductive cord being directly in contact with the wheel-rim surface.

Thus, in practice, at least one of said additional rubber compositions of said tire bead portion provides a wheel-rim mounting surface of the tire where said wheel-rim mounting surface is adapted to contact a metal rim to form a tire/rim assembly. For this invention, the electrically conductive cord is positioned on the outer surface of a bead rubber component intended to rim contacting. Usually, it is the tire chafer and toe guard, if used, which provide a tire wheel-rim mounting surface for mounting the tire on a rigid metal rim.

In practice, the aforesaid rubber reinforcing carbon blacks typically used for tire sidewall rubber compositions as earlier described, and therefore the said outer rubber sidewall layer of this invention, are usually of a somewhat larger particle size than carbon blacks conventionally used for tire tread rubber cap layer compositions. Such carbon blacks for reinforcing tire sidewall rubber compositions are, for example, those with ASTM designations of N550, N326 and N330. Rubber compositions containing these types of carcass grade rubber reinforcing carbon blacks typically require a content of at least 50 phr of the carbon black in the respective rubber composition to be suitably electrically conductive.

Alternatively, however, a blend of rubber reinforcing carbon blacks may be used for the sidewall layer such as, for example, at least two of N550, N326 and N375 carbon blacks.

In practice, it is preferred that at least 50 percent of the rubber reinforcing carbon black for said outer sidewall rubber layer is comprised of the aforesaid rubber reinforcing carbon blacks having ASTM designation of N550, N375 or N326.

As hereinbefore presented, while the tire tread rubber base layer is of a carbon black-rich rubber composition of a relatively high electrical conductivity, the outer tread rubber cap rubber layer may be of either a carbon black-rich rubber composition of relatively high electrical conductivity or a carbon black deficient (low carbon black content) rubber composition and therefore having a relatively low electrical conductivity.

If the tread cap layer is of a relatively low electrical conductivity, then a means is typically provided for a path of increased electrical conductivity to extend from the carbon black-rich tread base layer to the outer running surface of the tread rubber cap layer intended to be ground contacting. Such means may be, for example, the aforesaid thin rubber strip (e.g. from about 0.2 to about 5 mm wide) of a carbon black-rich rubber composition which extends through or around the tread rubber cap layer to at least a portion of its running surface.

Accordingly, where the tire tread outer cap rubber layer having an outer running surface is relatively electrically nonconductive, a means is provided for a path of reduced electrical resistivity to extend from said carbon black-rich tread belt ply layer to the outer running surface of said tread cap layer. Said means of providing a path of reduced electrical resistivity may be provided, for example, by the aforesaid thin rubber strip of a carbon black-rich rubber composition which contains at least 50 phr of carbon black wherein said thin rubber strip is positioned through, or around a portion of, the tread rubber cap layer to extend from a running surface of said tread cap layer to (A) said carbon black-rich rubber tread base layer, or to (B) an additional carbon black-rich rubber composition in contact with said tread base layer;

wherein the rubber composition of said tread base layer and said additional rubber composition in contact with said base layer contains at least 50 phr of carbon black.

Therefore, for example, such means of providing a path of reduced electrical resistivity is said thin rubber strip of a carbon black-rich rubber composition which contains at least 50 phr of carbon black positioned through, or around a portion of, the tread rubber cap layer to extend from a running surface of said tread cap layer to said carbon black-rich rubber tread base layer, wherein said rubber compositions of said individual tire bead component(s), said tire tread rubber base layer, said tire belt ply, and said thin rubber strip extending through or around said tread rubber cap layer contains a rubber reinforcing carbon black content in a sufficient amount that is above the carbon black percolation point to thereby make said rubber compositions relatively electrically conductive.

BRIEF DESCRIPTION OF THE DRAWINGS

Drawings are provided herewith a FIGURE which illustrates the positioning of an electrically conductive cord comprised of a filament composed of carbon fiber, metal filament or combination of carbon fiber and metal filaments, spirally (helically) wrapped around a core of at least one organic fiber filament.

The FIGURE depicts a cross-section of a portion of an open toroidally shaped pneumatic tire with the electrically conductive cord positioned between a carcass ply and an outer surface of a tire wheel-rim mounting surface.

THE DRAWINGS

Figure 1:
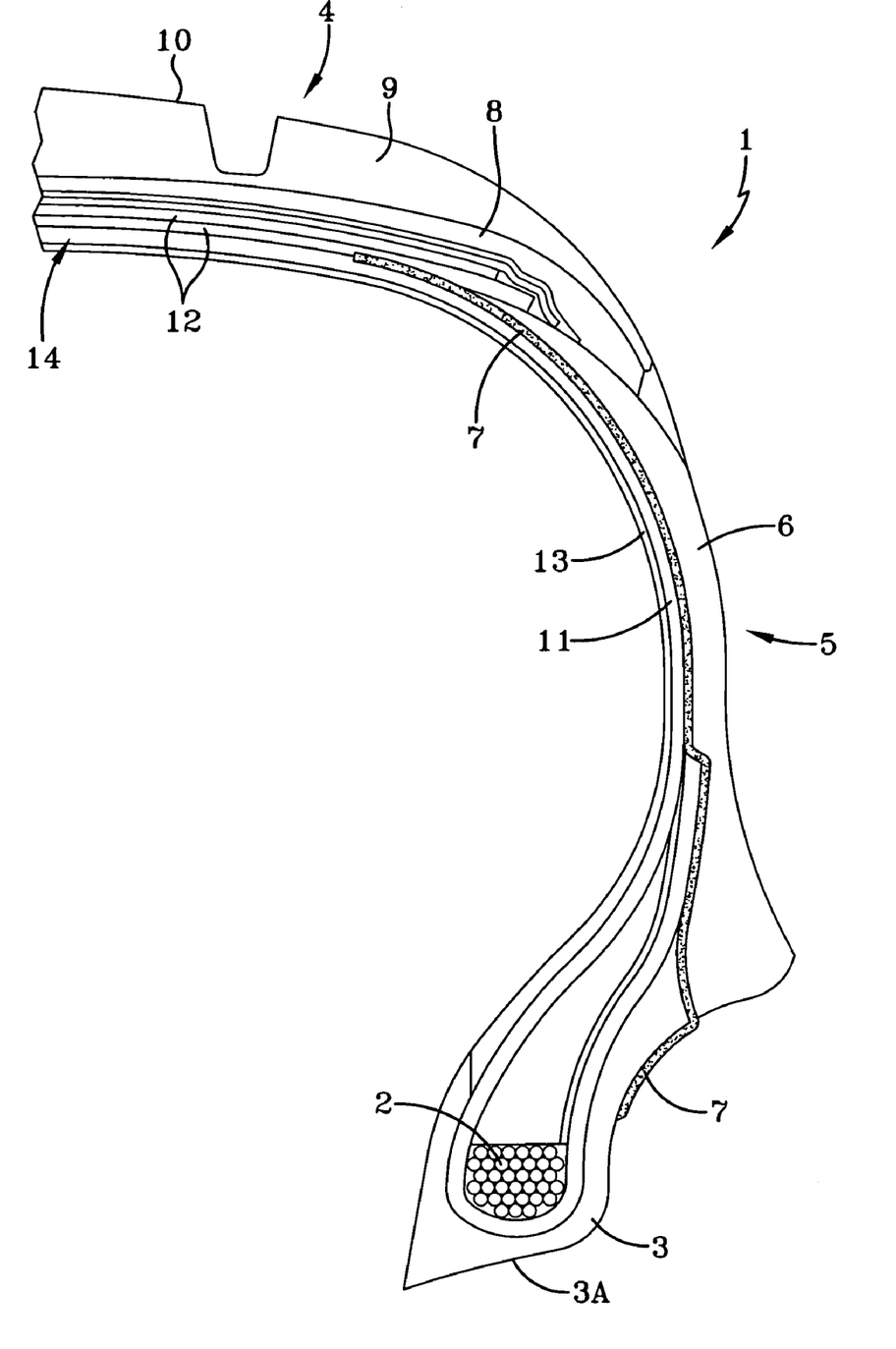

Referring to the FIGURE, a partial cross-section of an open toroidally shaped tire (1) is presented with two spaced apart bead regions (2), a rubber chafer/toe guard component (s) as additional components (3) as a part of the bead regions (2).

The rubber chafer/toe guard component (3) provides a wheel-rim mounting surface (3A) for mounting the tire on a rigid metal wheel-rim (not shown) to form an enclosed, air-containing cavity.

The FIGURE further depicts a circumferential rubber tread component (4) of a cap/base construction, outer rubber sidewalls (5) extending radially outward from said bead region(s) (2) and associated rubber chafer/toe guard component(s) (3) to and connecting with the peripheral edges of the tread (4) of the tire (1), together with one or more cord reinforced rubber carcass plies (11), wherein the carcass plies extend from bead portion-to-bead portion through the crown portion (14) of the tire (1) and where the carcass plies (11) support the rubber sidewalls (5) and ultimately the circumferential tread (4) and belt plies (12).

The FIGURE depicts a circumferential belt ply (12) underlying and supporting said tread component (4) composed of a rubber composition reinforced with steel cords, particularly brass coated steel cords.

The FIGURE additionally depicts an inner liner (13) positioned on the inner surface of the carcass ply (11).

In the FIGURE, the tire sidewall (5) is shown as being composed of an outer visible rubber layer (6).

In the FIGURE, an electrically conductive cord (7) is shown as being positioned on the outer surface of the carcass ply (11) and thereby on the inside of the rubber sidewall layer (6) namely between the carcass ply (11) and outer sidewall rubber layer (6) extending from the outer surface (the tire-rim contacting surface) of rubber chafer/toe guard components (3) of the bead region(s) (2) to and connecting with the rubber coating of the rubber coated belt ply (12) juxtapositioned to (positioned next to) the tread rubber base layer (8) of said tread component (4) and exclusive of the outer, exposed surface of the outer sidewall layer (6) where the electrically conductive cord (7) overlays the carcass ply (11) and is therefore next to said outer sidewall layer (6). The cord (7) is thereby actually positioned between the carcass ply (11) and the rubber sidewall (6). In this case the rubber of the carcass ply (11) may be relatively electrically nonconductive or electrically conductive.

The electrically conductive cord (7) is composed of a fine electrically conductive filament as at least one carbon fiber filament, at least one steel filament or combination of carbon fiber and steel filaments, which is (are) spirally (helically) wound around a core of at least one nylon, polyester or UHMWPE fiber.

For the FIGURE, the tire chafer/toe guard component(s) (3) is (are) of a rubber composition having a relatively low electrical conductivity (a relatively high electrical volume resistivity of at least 1.0E10 ohm-cm) and the rubber compositions of the tread base layer (8) and belt ply (12) have a relatively high electrical conductivity.

Accordingly, it is seen herein that the internal electrically conductive cord (7) provides a path of increased electrical conductivity (reduced electrical resistance) between the outer surface of said chafer component (3), particularly its outer wheel-rim mounting surface (3A) of the bead region (2) of the tire and the internal belt ply (12) and the associated tire tread base layer (8).

It can be seen that the internal electrically conductive cord (7) therefore physically extends to and over at least a portion of the outer visible surface of the bead region (2) having a wheel-rim mounting surface (3A). In practice, the internal portion of the electrically conductive cord (7) does not physically extend to the tread cap layer (9) and therefore preferably does not extend to the running surface (10) of the tire (1), although it does extend to the wheel-rim mounting surface (3A) of the tire and thereby is intended to actually contact the wheel rim (not shown) onto which the tire is to be mounted.

If the tread cap layer (9) rubber composition contains only a minimal content of carbon black reinforcement, such as for example, a silica-rich rubber composition which is primarily reinforced with precipitated silica, in a manner that the tire tread cap layer (9) rubber composition has a relatively low electrical conductivity, then a means may be provided to extend the path of electrical conductivity to the ground-contacting outer surface (10) of the tread cap layer (9) such as by, for example, providing a thin extension of the electrically conductive tread base layer (8) through the tread cap layer (9) to its outer surface (10) intended to be ground-contacting or around a portion of the tread cap layer (9) via a thin carbon black-rich rubber strip of a relatively electrically conductive rubber composition extending from a tire component adjacent to said outer surface (10) of said tread cap layer (9) of a carbon black-rich rubber composition of a relatively high electrical conductivity which is a part of or is in contact with said tread base layer (8).

It is envisioned herein said the aforesaid carbon black content of said outer sidewall layer causes the outer sidewall layer to have a significantly reduced electrical conductivity relative to said tire bead and tread components. It is therefore envisioned herein that the positioning of the said electrically conductive cord between the outer sidewall layer and carcass ply provides a path of increased electrical conductivity (reduced electrical resistance) between said chafer component and belt ply component and associated tread base layer component. It is further envisioned herein that such positioned electrically conductive cord provides a path of increased electrical conductivity (reduced electrical resistance) whether or not the outer sidewall rubber layer is relatively electrically conductive or electrically non-conductive.

As hereinbefore pointed out, various particulate rubber reinforcing carbon blacks conventionally used for reinforcement of various tire component rubber compositions are referenced in the *Vanderbilt Rubber Handbook* (1978), Pages 414 through 417.

A significant aspect of this invention is the providing a path of increased electrical conductivity (and path of least electrical resistance) extending between the outer tire-rim mounting (e.g. contacting) surface of bead portion(s) and internal belt portion of the tire via the positioned electrically conductive cord.

As hereinbefore discussed, such electrically conductive cord may be positioned, for example, on an outer surface of a carcass ply and thereby between the carcass ply and outer rubber sidewall.

In practice the organic fiber core of the cord may be comprised of at least one filament of various organic fibers, particularly synthetic fibers, such as, for example and not intended to be limiting, aramid, nylon, rayon, ultrahigh molecular weight polyethylene (UHMWPE), polyester or cotton or blend of such fibers.

In practice the electrically conductive filament(s) spirally (helically) wound around the core may be of non-metallic carbon fiber(s), various metals (electrically conductive metals), and alloys thereof, such as for example, steel (an iron alloy and including stainless steel), copper and brass (including brass coated steel) or a combination of carbon fiber(s) and metal fiber(s).

In practice the diameter of the core of the cord is preferably significantly greater than the diameter of the metal filament(s).

It is readily understood by those having skill in the art that the rubber compositions of the respective components of the tire would be compounded by methods generally known in the rubber compounding art, such as mixing the various sulfur-vulcanizable constituent rubbers with various commonly used additive materials such as, for example, curing aids, such as sulfur, activators, retarders and accelerators, processing additives, resins including tackifying resins, and plasticizers, fillers, pigments, fatty acid, zinc oxide, waxes, antioxidants and antiozonants and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Typical amounts of tackifier resins, if used, may comprise about 0.5 to about 10 phr, usually about 1 to about 5 phr. Typical amounts of processing aids may comprise 1 to 20 phr. Such processing aids are intended to exclude, or at least substantially exclude aromatic, naphthenic, and/or paraffinic processing oils. Typical amounts of antioxidants comprise about 1 to about 5 phr. Representative antioxidants may be, for example, diphenyl-p-phenylenediamine and others, such as, for example, those disclosed in the *Vanderbilt Rubber Handbook* (1978), Pages 344 through 346. Typical amounts of antiozonants comprise about 1 to about 5 phr. Typical amounts of fatty acids, if used, which can include stearic acid comprise about 0.5 to about 3 phr. Typical amounts of zinc oxide comprise about 2 to about 6 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide. The presence and relative amounts of the above additives are considered to be not an aspect of the present invention unless otherwise indicated.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, with a range of from about 0.5 to about 2.25 being preferred.

Accelerators are used to control the time and/or temperature required for vulcanization and to improve the properties of the vulcanizate. In one embodiment, a single accelerator system may be used, i.e., primary accelerator. Conventionally, a primary accelerator is used in amounts ranging from about 0.5 to about 2.0 phr. In another embodiment, combinations of two or more accelerators which the primary accelerator is generally used in the larger amount (0.5 to 2 phr), and a secondary accelerator which is generally used in smaller amounts (0.05 to 0.50 phr) in order to activate and to improve the properties of the vulcanizate. Combinations of these accelerators have been known to produce a synergistic effect on the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound. The presence and relative amounts of sulfur vulcanizing agent and accelerator(s) are not considered to be an aspect of this invention unless otherwise indicated.

Sometimes one or more of the antioxidants and antiozonants may be more simply referred to as antidegradants.

In one embodiment of the invention a tire is envisioned as being prepared according to this invention, exemplary of which is a tire prepared in a manner presented by the Drawing. The tire can be built, shaped, molded and cured by various methods which will be readily apparent to those having skill in such art.

While certain representative embodiments and details have been shown for the purpose of illustrating the invention, it will be apparent to those skilled in this art that various changes and modifications may be made therein without departing from the spirit or scope of the invention.

What is claimed is:

1. A pneumatic rubber tire of open toroidal shape is comprised of:
   (A) a tire tread portion comprised of:
      (1) a circumferential rubber tread of a cap/base layered construction wherein said tread cap rubber layer has an outer tire tread running surface and said tread base rubber layer underlies said tread cap layer, and
      (2) an internal circumferential belt ply layer underlying said circumferential tread wherein said belt ply layer is comprised of steel cords encompassed by a rubber composition contiguous with said tread base rubber layer;
   (B) two spaced apart bead regions individually comprised of:
      (1) a bead portion comprised of a composite of relatively inextensible steel cords encompassed by a bead coat rubber composition, and
      (2) an additional bead portion comprised of at least one rubber component wherein at least one of said at least one additional bead portion rubber component has a mounting surface adapted for mounting said tire on a rigid metal rim,
   (C) at least one carcass ply comprised of a cord reinforced carcass ply rubber composition wherein at least one of said carcass plies extends from one bead portion to the other bead portion through the crown region of the tire,
   (D) two outer tire rubber sidewall layers individually extending between said bead region and said tread, and
   (E) at least one electrically conductive cord comprised of at least one electrically conductive filament comprised of at least one of metal filament and carbon fiber spirally (helically) wound around a core of at least one organic fiber,
   wherein said electrically conductive cord extends from an outer surface of at least one of said at least one internal bead region additional rubber component having a wheel-rim tire mounting surface and said tread rubber base layer to said internal circumferential belt ply
   wherein said electrically conductive cord is positioned
      (1) on the outer surface of the outermost carcass ply between said carcass ply and said sidewall rubber layer,
   provided, however, that when said electrically conductive cord is positioned on the surface of the outermost carcass ply,
      (a) the said tread base layer, said tread belt ply, said tire bead composite, and said carcass ply or plies are relatively electrically conductive by being comprised of carbon black-rich, rubber based rubber compositions having a relatively high electrical conductivity, and
      (b) at least one of the said at least one additional bead component is relatively electrically non-conductive by being composed of a rubber composition which contains only a minimal reinforcing carbon black content or contains no carbon black;
      (c) the said outer rubber sidewall layer is:
         (i) relatively electrically conductive, by being comprised of a carbon black rich rubber composition by being comprised of a rubber composition which contains only a minimal reinforced carbon black content or contains no carbon black, or
         (ii) relatively electrically non-conductive provided however that when said electrically conductive cord is positioned on the surface of the outermost carcass ply between a carcass ply and said outer sidewall layer,
      (d) the said tread base layer, tread belt ply and tire bead composite are relatively electrically conductive by being comprised of carbon black-rich rubber compositions having a relatively high electrical conductivity, and
      (e) at least one of said carcass ply or plies and/or said outer sidewall rubber layer is:
         (i) relatively electrically conductive by being comprised of a rubber composition which contains only a minimal reinforced carbon black content or contains no carbon black, or
         (ii) relatively electrically non-conductive by being comprised of a rubber composition which contains only a minimal reinforced carbon black content or contains no carbon black;
   wherein the rubber composition of said tire tread rubber cap layer
      (f) is comprised of a carbon black-rich diene rubber based rubber composition thereby having a relatively high electrical conductivity, or
      (g) is comprised of a diene rubber based rubber composition which contains a more minimal carbon black content thereby having a relatively low electrical conductivity;
   wherein a thin carbon black-rich rubber strip thereby having a relatively high electrical conductivity is positioned through or around said tread cap layer having the more minimal carbon black content and wherein said thin rubber strip extends from, and as a part of, said tread base rubber layer to at least a portion of the running surface of said tread cap layer;
   wherein the rubber composition of said outer rubber sidewall layer contains reinforcing filler as:

(h) from about 50 to about 65 phr of rubber reinforcing carbon black, considered herein as being relatively electrically conductive, or
  (i) from about 25 to about 40 phr of rubber reinforcing carbon black, considered herein as having a relatively low electrical conductivity, or
  (ii) from about 25 to about 65 phr of amorphous, precipitated silica and from zero to 10 phr of rubber reinforcing carbon black, considered herein as having a relatively low electrical conductivity, or
(k) about 40 to about 70 phr of reinforcing filler as;
  (i) about 25 to about 40 phr of amorphous, precipitated silica and
  (ii) about 25 to about 35 phr of rubber reinforcing carbon black, considered herein as having a relatively low electrical conductivity;
wherein a coupling agent is provided for said amorphous silica which has a moiety reactive with hydroxyl groups contained on said amorphous silica and another moiety interactive with said rubber;
wherein said carbon black for said rubber sidewall layer has a dibutyl phthalate (DBP) value (ASTM D2414) in a range of from about 115 to about 125 $cm^3/100$ g together with an Iodine value (ASTM D1510) in a range of from about 35 to about 50 ml/100 g;
wherein the rubber composition of said carcass ply or plies contains reinforcing filler as:
(l) about 45 to about 70 phr of rubber reinforcing carbon black, considered herein as being relatively electrically conductive, or
(m) from 25 to about 60 phr of reinforcing filler as;
  (i) from 5 to about 35 phr of carbon black, and
  (ii) about 15 to about 55 phr of amorphous, precipitated silica together with a coupling agent for said silica, considered herein as having a relatively low electrical conductivity;
wherein said carbon black has a dibutyl phthalate (DBP) value (ASTM D2414) in a range of from about 70 to about 110 $cm^3/100$ g together with an Iodine value (ASTM D1510) in a range of from about 30 to about 80 ml/100 g;
wherein the rubber composition for said tread rubber cap layer contains reinforcing filler as:
  (n) about 45 to about 110 phr of rubber reinforcing carbon black considered herein as being relatively electrically conductive, or
  (o) from 45 to about 105 phr of reinforcing filler as;
    (i) from 5 to about 25 phr of carbon black, and
    (ii) about 40 to about 100 phr of amorphous, precipitated silica together with a coupling agent for said silica, considered herein as having a relatively low electrical conductivity;
wherein said carbon black has a dibutyl phthalate (DBP) value (ASTM D2414) in a range of from about 110 to about 130 $cm^3/100$ g together with an Iodine value (ASTM D1510) in a range of from about 85 to about 150 ml/100 g;
wherein the rubber composition for said thin rubber strip extending through or around said tread rubber cap layer is of a carbon black-rich rubber composition, containing about 50 to about 75 phr of rubber reinforcing carbon black having a dibutyl phthalate (DBP) value in a range of from about 100 to about 130 $cm^3/100$ g together with an Iodine value in a range of from about 90 to about 125 ml/100 g;

wherein the rubber composition of the said bead coat contains about 60 to about 125 phr of rubber reinforcing carbon black having a dibutyl phthalate (DBP) value in a range of from about 70 to about 125 $cm^3/100$ g together with an Iodine value in a range of from about 80 to about 145 ml/100 g;
wherein the rubber composition of said at least one additional bead component contains reinforcing filler as:
  (p) from about 50 to about 100 phr of rubber reinforcing carbon black, considered herein as being relatively electrically conductive, or
  (q) from about 60 to about 125 phr of reinforcing filler as:
    (i) from about 50 to about 100 phr of amorphous, precipitated silica together with a coupling agent for the silica, and
    (ii) from about 5 to about 35 phr of rubber reinforcing carbon black, considered herein as having a relatively low electrical conductivity;
wherein the coupling agent provided for said amorphous silica in said at least one additional bead component which has a moiety reactive with hydroxyl groups (e.g. silanol groups) contained on said amorphous precipitated silica and another moiety interactive with said rubber;
wherein said carbon black for said at least one additional bead component has a dibutyl phthalate (DBP) value (ASTM D2414) in a range of from about 110 to about 130 $cm^3/100$ g together with an Iodine value (ASTM D1510) in a range of from about 85 to about 150 ml/100 g;
wherein the rubber composition of said belt ply contains from about 55 to about 75 phr of rubber reinforcing carbon black having a dibutyl phthalate (DBP) value in a range of from about 65 to about 85 $cm^3/100$ g together with an Iodine value in a range of from about 75 to about 95 ml/100 g, considered herein as being relatively electrically conductive;
wherein the rubber composition of said tire tread rubber base layer contains from about 50 to about 70 phr of rubber reinforcing carbon black having a dibutyl phthalate (DBP) value in a range of from about 90 to about 125 $cm^3/100$ g together with an Iodine value in a range of from about 40 to about 95 ml/100 g, considered herein as being relatively electrically conductive.

2. The tire of claim 1 wherein the rubber compositions of said individual tire bead coat, said tire tread rubber base layer, said tire belt ply, said optionally relatively electrically conductive tread rubber cap layer, said relatively electrically conductive outer sidewall layer, and said optional thin rubber strip extending through or around said tread rubber cap layer contain a rubber reinforcing carbon black content of at least 40 phr and in a sufficient amount that is above the carbon black percolation point.

3. The tire of claim 1 having an electrical path extending from said wheel-rim mounting surface rubber component in the bead region of the tire to said electrically conductive cord thence to either said electrically conductive tread base rubber layer or through said electrically conductive rubber of said belt ply to said tread base rubber layer, thence to the running surface of said tire rubber cap layer via said tire rubber cap layer or, optionally, via said thin rubber strip which optionally extends through or around said tread rubber cap layer to at least a portion of the running surface thereof and wherein said at least one electrically conductive cord is exclusive of an outer surface of said tire.

4. The tire of claim 3 wherein said at least one electrically conductive cord is comprised of at least one electrically conductive metal filament spirally (helically) wound around a core of filaments selected from at least one of aramid, nylon, rayon, polyester, ultra high molecular weight polyethylene and cotton fibers.

5. The tire of claim 3 wherein said at least one electrically conductive cord is comprised of an electrically conductive carbon fiber spirally (helically) wound around a core of filaments selected from at least one of aramid, nylon, rayon, polyester, ultra high molecular weight polyethylene and cotton fibers.

6. The tire of claim 3 wherein said at least one electrically conductive cord is comprised of a combination of at least one electrically conductive metal filament and carbon fiber spirally (helically) wound around a core of filaments selected from at least one of aramid, nylon, rayon, polyester, ultra high molecular weight polyethylene and cotton fibers.

7. The tire of claim 1 wherein said at least one electrically conductive cord extends from the outer rim-contacting surface of said at least one tire bead component to said internal tire tread portion.

8. The tire of claim 7 wherein said at least one electrically conductive cord is comprised of at least one electrically conductive metal filament spirally (helically) wound around a core of filaments selected from at least one of aramid, nylon, rayon, polyester, ultra high molecular weight polyethylene and cotton fibers and wherein the diameter of said core of the cord is preferably significantly greater than the diameter of said at least one metal filament.

9. The tire of claim 7 wherein said at least one electrically conductive cord is comprised of an electrically conductive carbon fiber spirally (helically) wound around a core of filaments selected from at least one of aramid, nylon, rayon, polyester, ultra high molecular weight polyethylene and cotton fibers and wherein the diameter of said core of the cord is preferably significantly greater than the diameter of said carbon fiber.

10. The tire of claim 1 wherein said at least one electrically conductive cord extends from the outer rim-contacting surface of said at least one tire bead component to said internal circumferential belt ply component.

11. The tire of claim 1 wherein said electrically conductive cord is positioned between a carcass ply and said outer sidewall rubber layer.

12. The tire of claim 1 wherein said outer sidewall rubber layer contains from about 25 to about 35 phr of rubber reinforcing carbon black and, further, that at least 50 percent of the rubber reinforcing carbon black for said outer sidewall rubber layer is comprised of a carbon black having an ASTM designation of N550, N326or N330and.

wherein said at least one electrically conductive cord has an electrical resistance of less than 100 ohms.

13. The tire of claim 1 wherein said tire tread outer cap rubber layer has an outer running surface of the tire and said outer tread cap rubber layer is relatively electrically non-conductive and wherein a means is provided for a path of reduced electrical resistivity to extend from said carbon black-rich tread belt ply layer to the outer running surface of said tread cap layer, wherein said means of providing a path of reduced electrical resistivity is said thin rubber strip of a carbon black-rich rubber positioned through, or around a portion of, the tread rubber cap layer to extend from a running surface of said tread cap layer to (A) said carbon black-rich rubber tread base layer, or to
(B) an additional carbon black-rich rubber composition in contact with said tread base layer;

wherein the rubber composition of said additional rubber composition in contact with said base layer contains at least 50 phr of carbon black.

14. The tire of claim 13 wherein said means of providing a path of reduced electrical resistivity is said thin rubber strip of a carbon black-rich rubber composition positioned through, or around a portion of, the tread rubber cap layer to extend from a running surface of said tread cap layer to said carbon black-rich rubber tread base layer, wherein said rubber compositions of said tire bead composite, said tire tread rubber base layer, said tire belt ply, and said thin rubber strip extending through or around said tread rubber cap layer contains a rubber reinforcing carbon black content in a sufficient amount that is above the carbon black percolation point to thereby make said rubber compositions relatively electrically conductive.

15. The tire of claim 1 wherein the carbon black for said tire bead portion rubber components is selected from at least one of N660, N550, N375, N236 and N234 carbon blacks; the carbon black for said tire tread rubber base layer is selected from at least one of N660, N555, N375 and N347 carbon blacks; the carbon black for said rubber of said belt ply is selected from at least one of N347, N330 and N326 carbon blacks; the carbon black for said tread rubber cap layer is selected from at least one of N375, N234, N220, N134, N121, N115 and N110 carbon blacks; the carbon black for said thin rubber strip which optionally extends through or around said tread rubber cap layer is selected from at least one of N375, N347 and N234 carbon blacks; the carbon black for said carcass ply rubber is selected from at least one of N660, N550 and N326 carbon blacks; and the carbon black for said tire sidewall rubber layer is selected from at least one of N550, N660, N375, N330 and N326 carbon blacks.

16. The tire of claim 1 wherein said at least one electrically conductive cord is comprised of at least one electrically conductive metal filament spirally (helically) wound around a core of filaments selected from at least one of aramid, nylon, rayon, polyester, ultra high molecular weight polyethylene and cotton fibers.

17. The tire of claim 1 wherein said at least one electrically conductive cord is comprised of at least one electrically conductive carbon fiber spirally (helically) wound around a core of filaments selected from at least one of aramid, nylon, rayon, polyester, ultra high molecular weight polyethylene and cotton fibers.

18. The tire of claim 1 wherein said at least one electrically conductive cord is comprised of a combination of at least one electrically conductive metal filament and carbon fiber spirally (helically) wound around a core of filaments selected from at least one of aramid, nylon, rayon, polyester, ultra high molecular weight polyethylene and cotton fibers.

19. The tire of claim 1 wherein said at least one electrically conductive cord is comprised of at least one electrically conductive metal filament and/or carbon fiber spirally (helically) wound around a core of filaments selected from at least one of aramid, nylon, rayon, polyester, ultra high molecular weight polyethylene and cotton fibers, wherein the diameter of said core of the cord is preferably significantly greater than the diameter of said at least one metal filament and/or carbon fiber and wherein said at least one electrically conductive cord has an electrical resistance of less than 100 ohms.

* * * * *